(12) United States Patent
Murawski

(10) Patent No.: US 9,640,151 B2
(45) Date of Patent: May 2, 2017

(54) INSTRUMENT PLECTRUM AND SYSTEM FOR PROVIDING TECHNIQUE FEEDBACK AND STATISTICAL INFORMATION TO A USER

(71) Applicant: Pickatto LLC, Weirton, WV (US)

(72) Inventor: Michael G. Murawski, Weirton, WV (US)

(73) Assignee: Pickatto LLC, Weirton, WV (US)

( * ) Notice: Subject to any disclaimer, the term of this patent is extended or adjusted under 35 U.S.C. 154(b) by 0 days.

(21) Appl. No.: 15/179,037

(22) Filed: Jun. 10, 2016

(65) Prior Publication Data
US 2016/0365075 A1    Dec. 15, 2016

Related U.S. Application Data

(60) Provisional application No. 62/174,958, filed on Jun. 12, 2015.

(51) Int. Cl.
*G10D 3/16* (2006.01)
*G10H 3/18* (2006.01)

(52) U.S. Cl.
CPC .............. *G10D 3/163* (2013.01); *G10D 3/16* (2013.01); *G10H 3/18* (2013.01); *G10H 3/186* (2013.01)

(58) Field of Classification Search
CPC .............................. G10D 3/163; G10H 3/186
USPC ..................................... 84/322, 737
See application file for complete search history.

(56) References Cited

U.S. PATENT DOCUMENTS

| | | | | |
|---|---|---|---|---|
| 3,530,227 A | * | 9/1970 | Terlinde ................ | G10H 1/342 84/322 |
| 4,064,781 A | * | 12/1977 | Fals ...................... | G10D 3/163 84/322 |
| 4,171,659 A | * | 10/1979 | Tumminaro .......... | G10H 3/181 84/315 |
| 4,235,144 A | * | 11/1980 | Lubow .................. | G10H 1/06 84/322 |
| 4,365,537 A | * | 12/1982 | Pogoda ................. | G10D 3/163 84/320 |
| 4,867,032 A | * | 9/1989 | Lukehart .............. | G10D 3/163 84/322 |
| 5,300,730 A | * | 4/1994 | Ekhaus ................. | G10D 3/163 84/320 |
| 5,478,969 A | * | 12/1995 | Cardey, III .......... | G10H 1/02 84/626 |

(Continued)

*Primary Examiner* — David Warren
*Assistant Examiner* — Christina Schreiber
(74) *Attorney, Agent, or Firm* — The Webb Law Firm

(57) ABSTRACT

A plectrum or pick for an instrument is provided. The pick includes: a pick body having a central portion configured to be held by a user and a tip configured to contact an instrument string; at least one sensor arranged on or embedded in the pick body and configured to sense information representative of a pluck of the string with the pick body; and at least one pressure sensor arranged on or embedded in the pick body. The at least one pressure sensor can be configured to sense pressure between the pick body and the user's hand. The pick also includes a wireless transmitter configured to obtain information from the respective sensors and to transmit the obtained information to a remote device. A system for providing feedback to a user regarding picking techniques including an instrument pick and feedback device is also provide.

20 Claims, 10 Drawing Sheets

(56) References Cited

U.S. PATENT DOCUMENTS

| | | | | |
|---|---|---|---|---|
| 5,693,904 A * | 12/1997 | Kihneman | ............. | G10H 3/181 |
| | | | | 84/725 |
| 5,864,083 A * | 1/1999 | Caren | ...................... | G10H 1/46 |
| | | | | 84/322 |
| 6,245,976 B1 * | 6/2001 | Sander | ................... | G10D 3/163 |
| | | | | 84/320 |
| 6,946,592 B1 * | 9/2005 | Chick | .................... | G10D 3/163 |
| | | | | 84/322 |
| 7,982,124 B1 * | 7/2011 | Landis | .................... | G10H 3/18 |
| | | | | 84/727 |
| 8,395,038 B2 * | 3/2013 | Smith | .................... | G10D 3/163 |
| | | | | 84/322 |
| 8,766,071 B2 * | 7/2014 | Risolia | .................. | G10D 3/163 |
| | | | | 84/322 |
| 9,147,382 B2 * | 9/2015 | Holm | ...................... | G10D 3/163 |
| 9,190,034 B2 * | 11/2015 | Fortmuller | ............. | G10D 3/163 |
| D747,989 S * | 1/2016 | Bassan-Eskenazi | ...... | D10/106.9 |
| 9,361,865 B2 * | 6/2016 | Holm | ...................... | G10D 3/163 |
| 2005/0262988 A1 * | 12/2005 | Yurkovsky | ............... | G10G 7/02 |
| | | | | 84/455 |
| 2006/0272489 A1 * | 12/2006 | Remignanti | ......... | G10H 1/0091 |
| | | | | 84/723 |
| 2007/0028746 A1 * | 2/2007 | Herring | .................. | G10D 3/163 |
| | | | | 84/322 |
| 2007/0175322 A1 * | 8/2007 | Baum | .................. | G10H 1/0083 |
| | | | | 84/737 |
| 2014/0144308 A1 * | 5/2014 | Holm | .................... | G10D 3/163 |
| | | | | 84/322 |
| 2016/0365075 A1 * | 12/2016 | Murawski | .............. | G10D 3/163 |
| 2017/0032769 A1 * | 2/2017 | Holm | .................... | G10D 3/163 |

* cited by examiner

INSTRUMENT PLECTRUM AND SYSTEM FOR PROVIDING TECHNIQUE FEEDBACK AND STATISTICAL INFORMATION TO A USER

CROSS REFERENCE TO RELATED APPLICATION

This application claims priority to U.S. Provisional Patent Application No. 62/174,958 filed Jun. 12, 2015, the disclosure of which is hereby incorporated in its entirety by reference.

BACKGROUND OF THE INVENTION

Field of the Invention

This disclosure relates, in general, to a plectrum or pick for a musical instrument, such as a guitar or bass guitar, and particularly to a pick including electronic circuitry for receiving data representative of playing technique and providing the technique data to the user in the form of feedback, for example audible or numerical feedback.

Description of the Related Art

A standard instrument plectrum (referred to hereinafter as "a pick") is a flat, substantially triangular structure that is between about 0.5 mm and 5.0 mm thick, and is used to pluck a string of a musical instrument, such as a guitar. An instrument plectrum can be colloquially referred to as a pick (e.g., a guitar pick). A pick is generally held between the thumb and index finger of a user, though alternative techniques for holding a pick are used for certain picking styles. Some picks can include depressions or textured regions (referred to herein as "a grip portion") that make the pick easier for the user to hold. Other picks are formed from an entirely flat surface. A guitar pick can be used both for plucking individual strings, as well as for strumming multiple strings in sequence to produce a chord (i.e., a collection of multiple notes). Skilled guitar players pluck strings using both a front and back side of the pick. A skilled guitar player can perform about 500 or more string plucks per minute.

Guitar picks embedded with types of electronic circuitry for providing visual effects or for sensing information about use of the pick are known. For example, United States Patent Application Publication No. 2014/0144308 to Holm et al., entitled "Electronic Guitar Pick and Method", discloses a guitar pick comprising an enclosure or housing, sensing circuitry, and transmission circuitry. The sensing circuitry is disposed within a cavity formed in a central portion of the enclosure or housing. The sensing circuitry can measure acceleration or orientation of the pick. Data from the sensing circuitry can be used to determine movement representative of a strumming action. Data collected by the sensing circuitry can trigger visual indicators on the pick and/or can be transmitted to external systems or devices. For example, a light emitting diode (LED) on the pick can be configured to emit light in response to a strumming movement to provide a visual effect. Information obtained from sensors on the pick can also be transmitted to external sources and used, for example, to provide feedback to the user or to modify operation of an external system, such as an external effects generator (e.g., audio outputs, distortion generator, or stage effects such as a fog generator).

However, existing instrument picks that include electronic circuitry may not be suitable for use as a practice pick or to provide feedback for a user regarding technique while practicing. Further, existing electronic picks can be an inconvenient size or shape that can be difficult to hold or maneuver and, as such, are not suitable for use in training, instruction, or practice.

SUMMARY OF THE INVENTION

In view of the forgoing, there is a need for an instrument pick that can be used for providing technique feedback to a user, such as during practice sessions. The pick may be capable of recording and/or transmitting user data for providing useful feedback to the user. Therefore, in some examples, an instrument pick is provided herein including electrical circuitry for sensing contact between the pick and a string. In other examples, the pick may be configured to identify movement representative of a picking or strumming action. Information obtained from the pick can be used to provide technique feedback to the user. For example, information from the pick can be provided to the user to show whether the user is holding the pick correctly (e.g., whether a holding pressure is within an acceptable range), whether the user's picking technique is correct (e.g., whether the user is holding the pick at a suitable angle and contacting the string with the correct side of the pick), and an amount of time in use (e.g., amount of practice time in a practice session).

According to one aspect of the disclosure, a pick for an instrument is provided. The pick includes a pick body; one or more contact sensors arranged on or embedded in the pick body and configured to identify contact between the pick body and a string of an instrument; one or more pressure sensors arranged on or embedded in the pick body and configured to identify pressure between the pick body and a hand of a user; and a data transmitter configured to obtain pluck information from the one or more contact sensors and/or pressure information from the one or more pressure sensors and to transmit the obtained information to an external source.

According to another aspect of the disclosure, a system for providing feedback to a user regarding picking technique is provided. The system includes: a guitar pick for plucking a string of an instrument. The instrument pick comprises: a pick body; one or more contact sensors arranged on or embedded in the pick body and configured to identify contact between the pick body and a string of an instrument; one or more pressure sensors arranged on or embedded in the pick body and configured to identify pressure between the pick body and a hand of a user; and a data transmitter configured to obtain pluck information from the one or more contact sensors and/or pressure information from the one or more pressure sensors and to transmit the obtained information to an external source. The system also includes: a feedback device remote from the instrument pick. The feedback device comprises: a transmitter configured to communicate either directly or indirectly with the data transmitter of the instrument pick; a controller configured to receive the pluck information and/or the pressure information from the device transmitter and to determine feedback based, at least in part, on the pluck information and/or the pressure information; and a visual display or audio speaker for providing the feedback to the user.

According to another aspect of the disclosure, a method of providing technique feedback to a user includes the steps of: contacting a string of an instrument with an instrument pick; obtaining pluck information and/or pressure information from sensors embedded on or connected to the instrument pick; and providing feedback to a user, the feedback being based, at least in part, on the pluck information and/or the pressure information.

According to another aspect of the disclosure, a pick for an instrument includes: a pick body having a central portion configured to be held by a user and a tip configured to contact an instrument string; at least one sensor arranged on or embedded in the pick body and configured to sense information representative of a pluck of the string with the pick body; and at least one pressure sensor arranged on or embedded in the pick body. The at least one pressure sensor can be configured to sense pressure between the pick body and the user's hand. The pick also includes a wireless transmitter configured to obtain information from the respective sensors and to transmit the obtained information to a remote device.

In some examples, the pick body is between 1 mm and 3 mm thick. The pick body may be a substantially triangular or polygonal shape having a maximum width and a maximum length of less than about 40 mm. Information representative of the string pluck can include information regarding whether a target zone of the pick body contacted the string.

In some examples, the at least one sensor configured to sense information representative of the string pluck includes a motion sensor configured to sense movement representative of a pluck. The motion sensor can be one or more of an accelerometer and a gyroscope. In other examples, the at least one sensor configured to sense information representative of the string pluck can include at least one contact sensor configured to sense contact between the pick body and the string. The at least one contact sensor can include an array of sensors arranged to identify a portion of the pick body that contacts the string.

In some examples, the array of sensors can be arranged to identify when a target zone of the pick body contacts the string and/or when another portion of the pick body contacts the string.

In some examples, the pick body includes a grip portion. The at least one pressure sensor can be disposed on the grip portion. The pick can further include an enclosure extending proximally from a proximal end of the pick body. The wireless transmitter can be at least partially disposed in the enclosure. The pick body can also include a conductive element at least partially enclosed within a plastic cover. The conductive element may electronically connect the wireless transmitter, the at least one pressure sensor, and the at least one sensor configured to identify the string pluck.

In some examples, the information representative of the string pluck can include an indication of whether a front surface of the pick body contacted the string or a back surface of the pick body contacted the string.

According to another aspect of the disclosure, a system for providing feedback to a user regarding picking technique includes an instrument pick for plucking a string of an instrument and a feedback device remote from the pick. The pick can include: a pick body having a central portion configured to be held by a user and a tip configured to contact an instrument string; at least one sensor arranged on or embedded in the pick body and configured to sense information representative of a pluck of the string with the pick body; and at least one pressure sensor arranged on or embedded in the pick body and configured to sense pressure between the pick body and the user's hand. The pick may also include a wireless transmitter configured to obtain information from the respective sensors and to wirelessly transmit the obtained information. The feedback device may include a controller. The controller can be configured to: receive and process information from the at least one pressure sensor of the instrument pick; receive and process information from the at least one sensor configured to sense information representative of the string pluck; determine a holding pressure exerted on the pick by the user and/or a number of identified string plucks performed by the user based, at least in part, on the received and processed information; and provide feedback to the user regarding the holding pressure and/or the number of string plucks.

In some examples, the feedback device can include a visual display. In that case, the feedback provided to the user can include an indication on the visual display comparing the determined holding pressure to target minimum and/or maximum holding pressures. In some instances, the controller can be configured to determine whether the identified string pluck was an upstroke or a downstroke based on the received and processed information. In some instances, the feedback to the user can include an indication of a ratio of upstrokes and downstrokes for the identified string plucks.

In some examples, the feedback includes an indication of plucking efficiency based on a number of identified string plucks that contact a target zone of the pick body and a number of identified string plucks that do not contact the target zone of the pick body. The feedback regarding the string plucks can also include one or more of plucking rate and total number of string plucks.

According to another aspect of the disclosure, a computer-implemented method for providing technique feedback to a user based on information received from sensors arranged on or embedded in an instrument pick includes: receiving and processing information from at least one pressure sensor arranged on or embedded in the instrument pick; receiving and processing information from at least one sensor arranged on or embedded in the instrument pick and configured to sense information representative of a string pluck; determining a holding pressure exerted on the instrument pick by the user and/or a number of identified string plucks performed by the user based, at least in part, on the received and processed information; and providing feedback to the user regarding the holding pressure and/or number of string plucks.

BRIEF DESCRIPTION OF THE DRAWINGS

Some of the advantages and features of the preferred embodiments of the invention have been summarized hereinabove. These embodiments, along with other potential embodiments of the device, will become apparent to those skilled in the art when referencing the following drawings in conjunction with the detailed descriptions as they relate to the figures.

DETAILED DESCRIPTION OF THE INVENTION

Figure 1A:
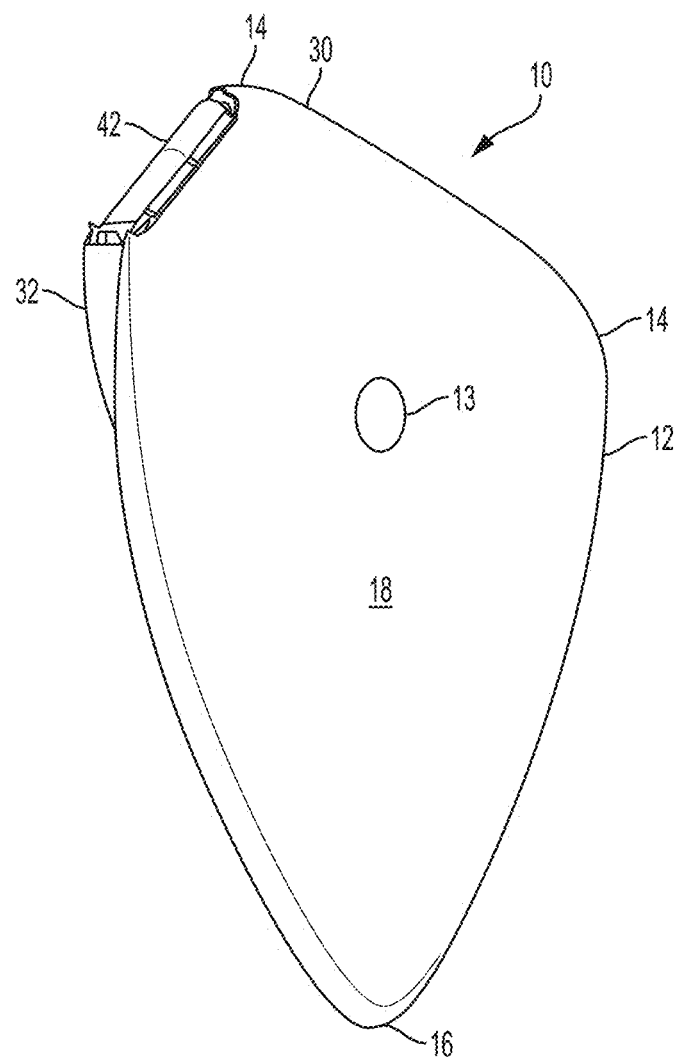
FIG. 1A is a perspective view of an instrument pick according to an aspect of the disclosure.
Figure 1B:
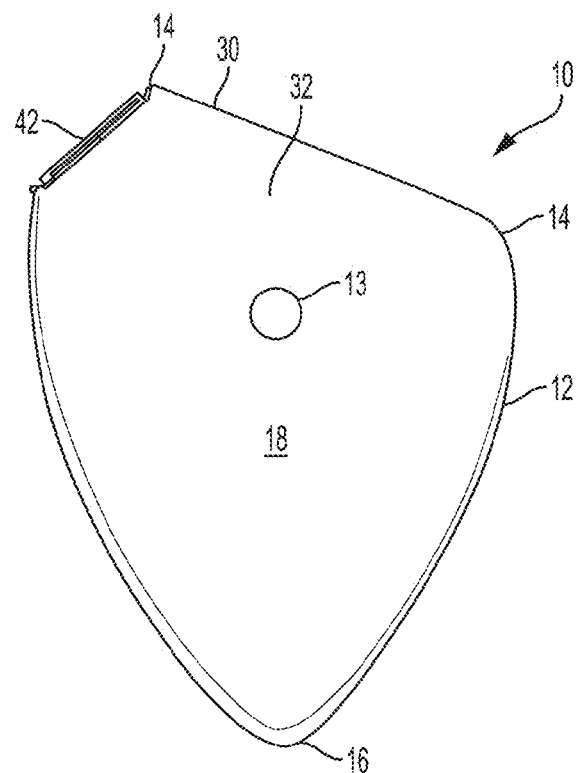
FIG. 1B is a front view of the instrument pick of FIG. 1A.
Figure 1C:
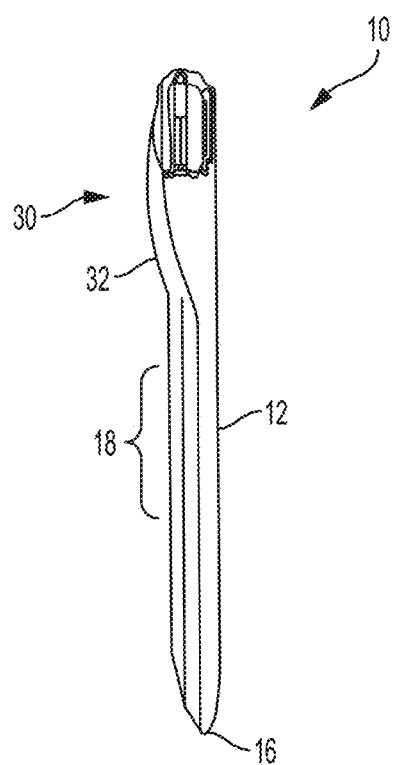
FIG. 1C is a side view of the instrument pick of FIG. 1A.

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that can be wired and/or wireless in nature. Additionally, two units or components can be in communication with each other even though the data transmitted can be modified, processed, routed, and the like, between the first and second unit or component. For example, a first unit can be in communication with a second unit even though the first unit passively receives data, and does not actively transmit data to the second unit. As another example, a first unit can be in communication with a second unit if an intermediary unit processes data from one unit and transmits processed data to the second unit. It will be appreciated that numerous other arrangements are possible.

The present disclosure is directed to an instrument pick for picking, plucking, or strumming strings of a musical instrument. While the pick is referred to hereinafter as a "guitar pick", it is understood that the pick can be used with any stringed musical instrument including, but not limited to a mandolin, bass, bass guitar, hammered dulcimer, harp, harpsichord, banjo, sitar, zither, or ukulele. Further, the principles for providing feedback to a user could be applied to other items for contacting strings of a musical instrument such as finger picks that aid in playing certain styles of music.

As discussed in detail herein, the guitar pick includes sensors embedded in or connected to the pick configured to count the number of plucks during a practice session. Previously, practice sessions were generally measured based on an amount of practice time. It is believed that measuring the number of string plucks provides a more accurate indication of the amount of practice a user performed during a practice session. Furthermore, since the picking hand is developed mainly through repetition of picking exercises and techniques, counting plucks allow a player to quantify practice activities and to set achievable practice goals. Thus, much like a basketball player who knows he needs to shoot 200 free throws in practice every day to perfect shooting technique, a user practicing with a guitar pick that records string plucks can see whether he or she is performing the needed repetitions each day.

In some examples, information from the sensors can be used to identify whether the string pluck is an upstroke or a downstroke. It is believed that a beginner student should take roughly 90% downstrokes to get used to using the pick. A more advanced user should have about a 60%/40% ratio of downstrokes to upstrokes. An indication that the user is not performing enough upstrokes or downstrokes can help the user to see which type of stroke pattern requires additional practice.

In some examples, the guitar pick can also determine what portion of the pick contacts the string. It has been determined that striking the string closer to the tip of the pick translates to a more efficient stroke. For example, a regular pluck can cause the pick to get held up between strings, thus taking more time to get from one stroke to the next. An efficient pluck allows the pick to pass from one string to the next more quickly resulting in increased picking speed.

In some examples, sensors on the instrument pick can be used to calculate pressure applied to the pick by the user. It has been determined that a pick that is held too loosely may fly out of the hand when playing; a pick held too tightly will tend to make the arm, hand, and fingers so tense that it will inhibit effective playing. Correct pressure on the pick allows the player to play with a relaxed hand. Additionally, in some cases, years of over squeezing the guitar pick can cause tendonitis or carpal tunnel in the picking hand. Practicing using a pick that provides pressure feedback can assist novice players to perfect relaxed picking techniques, which avoid risks of future injury.

In other examples, the pick can include sensors for measuring the angle of the pick relative to the strings. It has been observed that novice guitar players often hold the pick nearly perpendicular to the strings. Holding the pick at such a perpendicular orientation can make the hand or fingers tense which, as discussed above, inhibits effective playing. Instead, it is desirable in most cases to hold the pick at a shallower orientation of about 45 degrees.

Exemplary Guitar Pick

With reference to FIGS. 1A to 3, an exemplary guitar pick 10 for picking, plucking, or strumming strings of a guitar instrument is illustrated. The guitar pick 10 includes a pick body 12 formed, at least in part, from a thin hard material, such as plastic, and preferably from polycarbonate. In some cases, the pick body 12 can be formed from different colors of plastic. For example, a proximal end of the pick body 12 may be a first color and the distal end of the pick body 12 may be a second color. In some cases, an outer shell accessory can cover portions of the pick body 12. The outer shell accessory may protect electronic components of the pick 10. Additionally, users can change the appearance of the pick 10 by selecting a particular outer shell design based on personal aesthetic preference. Preferably, the pick body 12 is less than 3.5 mm thick and, more preferably, is within the range of between 1 mm and 3 mm thick. In one example, the pick body 12 is 2.8 mm thick. The pick body 12 is generally a substantially triangular or polygonal shaped structure having a central portion configured to be held between the thumb and forefinger of a user, one or more rounded corners 14 and/or edges on a proximal end of the body 12, and a tip portion 16 at a distal end thereof. As used herein, the term "proximal" refers to the portion of the pick 10 designed to be near the user's hand and the term "distal" refers to the portion of the pick 10 farthest away from the user's hand. The pick body 12 preferably has a maximum width and a maximum length of less than about 40 mm and, more preferably, within the range of about 15 mm to 30 mm. In some examples, as shown in FIGS. 1A to 3, the pick body 12 is a polygonal shaped structure that is about 34 mm long and about 25 mm wide. In some examples, the proximal most corner 14 can be slightly offset from the central longitudinal axis A (shown in FIG. 2A) of the body 12 to facilitate holding the pick 10 by right-handed players.

In some examples, the pick body 12 may include a grip 18 located at the central portion of the pick body 12. The grip 18 can include a depression or textured area to prevent the pick from slipping from a user's fingers. The pick body 12 may also include various illustrations (not shown) either for aesthetic purposes or for conveying information for a user. For example, the pick body 12 can include text information for a user to "Hold Here" or similar instructive phrases. The pick body 12 can also include a directional indicator 13 which identifies one side of the pick 10. As will be discussed herein, the electronic circuitry of the pick 10 needs to know which side of the pick body 12 is up (e.g., in contact with the user's thumb) to identify whether an upstroke or downstroke is being performed due to the fact that the pick can be used on either side. In some examples, software associated with the pick 10 instructs the user to confirm that his or her thumb is contacting the side of the pick body 12 with the directional indicator 13.

Figure 2A:
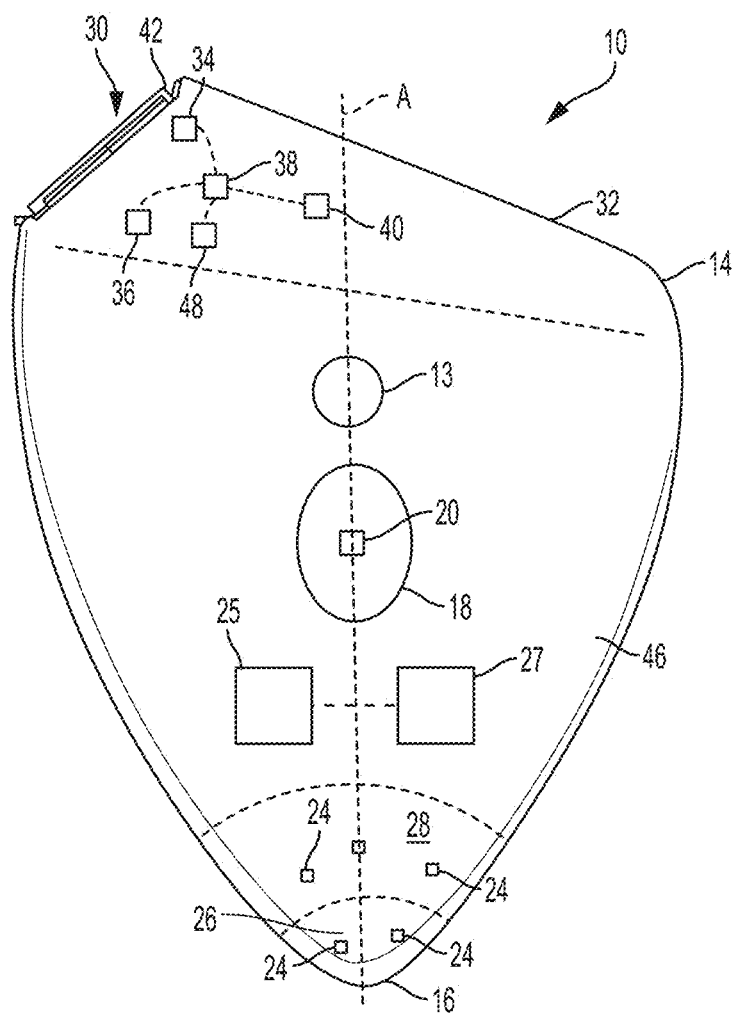
FIG. 2A is a schematic drawing of electronic circuitry of the instrument pick of FIG. 1A.
Figure 2B:
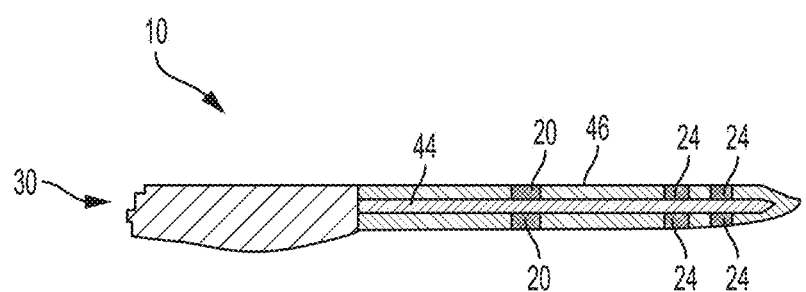
FIG. 2B is a schematic cross-sectional drawing of the instrument pick of FIG. 1A.

With specific reference to FIGS. 2A and 2B, the pick body 12 can include one or more pressure sensors 20 disposed within and/or adjacent to the grip 18 and configured to measure an amount of pressure (e.g., holding pressure) exerted on the pick 10 by the user's fingers. For example, the pressure sensors 20 can be attached to the pick body 12 or may be embedded in or on the pick body 12 in a similar manner to how electrical elements are embedded to a printed circuit board. For example, the pressure sensors 20 can be connected by printed conductive traces, according to processes known in the art for creating printed circuit boards. The pressure sensors 20 can be any type of pressure transducer or strain gauge as is known in the art. Generally, a user should maintain a consistent, light pressure on the pick 10 that is sufficient to prevent the pick 10 from slipping from the user's hand. However, as discussed above, gripping the pick 10 too tightly should also be avoided. A threshold or preferred pressure can be predetermined or established based on analysis of a user's playing technique. When the measured pressure deviates substantially from the predetermined threshold value or the established normal holding pressure for the user, a feedback system in communication with the pick 10 can alert the user of the change. In some examples, the system can also instruct the user whether to increase or decrease holding pressure.

In some examples, the pick 10 can also include one or more sensors for identifying contact between the guitar pick and strings (e.g, a string pluck). In some examples, movement representative of contact with the string (e.g., picking or strumming movement) can be determined based on information received from one or more motion sensors, such as an accelerometer 25 and/or gyroscopes 27 embedded in and/or connected to the pick body. In general, information from the accelerometer 25 is used to determine acceleration and/or direction of movement of the pick 10. Information from the gyroscope 27 is used to determine an orientation and/or changes in orientation of the pick 10. The movement information from the accelerometer 25 and/or gyroscope 27 can be used to determine a number of string plucks (e.g., picks or strums) performed during a practice session, day, or week. In some examples, movement information may also be used to determine pluck force, pluck speed, and relative movement direction of the pick 10 during the string pluck.

In some examples, the pick body 12 can include one or more contact sensors 24 arranged to identify when and, in some cases, what portion of the pick body 12 contacts the instrument string. Information about contact and/or contact location can be used to assess various aspects of picking techniques including plucking speed, plucking accuracy, or plucking force. Information from the contact sensor 24 can also be used to identify and count each string pluck. It is understood that in some instances a user can contact multiple strings during a single plucking motion, such as when playing a chord (e.g., a strum). For computational purposes, the pick 10 may count a strum as a single string pluck, even though the pick 10 contacts multiple strings in succession. However, other techniques, such as sweep-picking, in which multiple strings are contacted in succession, but with identifiable pauses between string contacts, can be counted as individual string plucks. Contact location information can be used to determine or document plucking efficiency. It has been determined that it is most efficient to contact the instrument string with the distal end (e.g., a tip 16) of the pick body 12. Contacting the string with more proximal portions of the pick body 12 is less efficient and should be avoided. Therefore, the one or more contact sensors 24 can be arranged in an array or pattern to define a picking efficiency or target zone 26 near the tip 16 of the pick body 12. A less desirable or incorrect zone 28 is located at a position proximal to the target zone 26 and can include additional contact sensors 24 to identify when the instrument string contacts this portion of the pick body 12.

Figure 3:
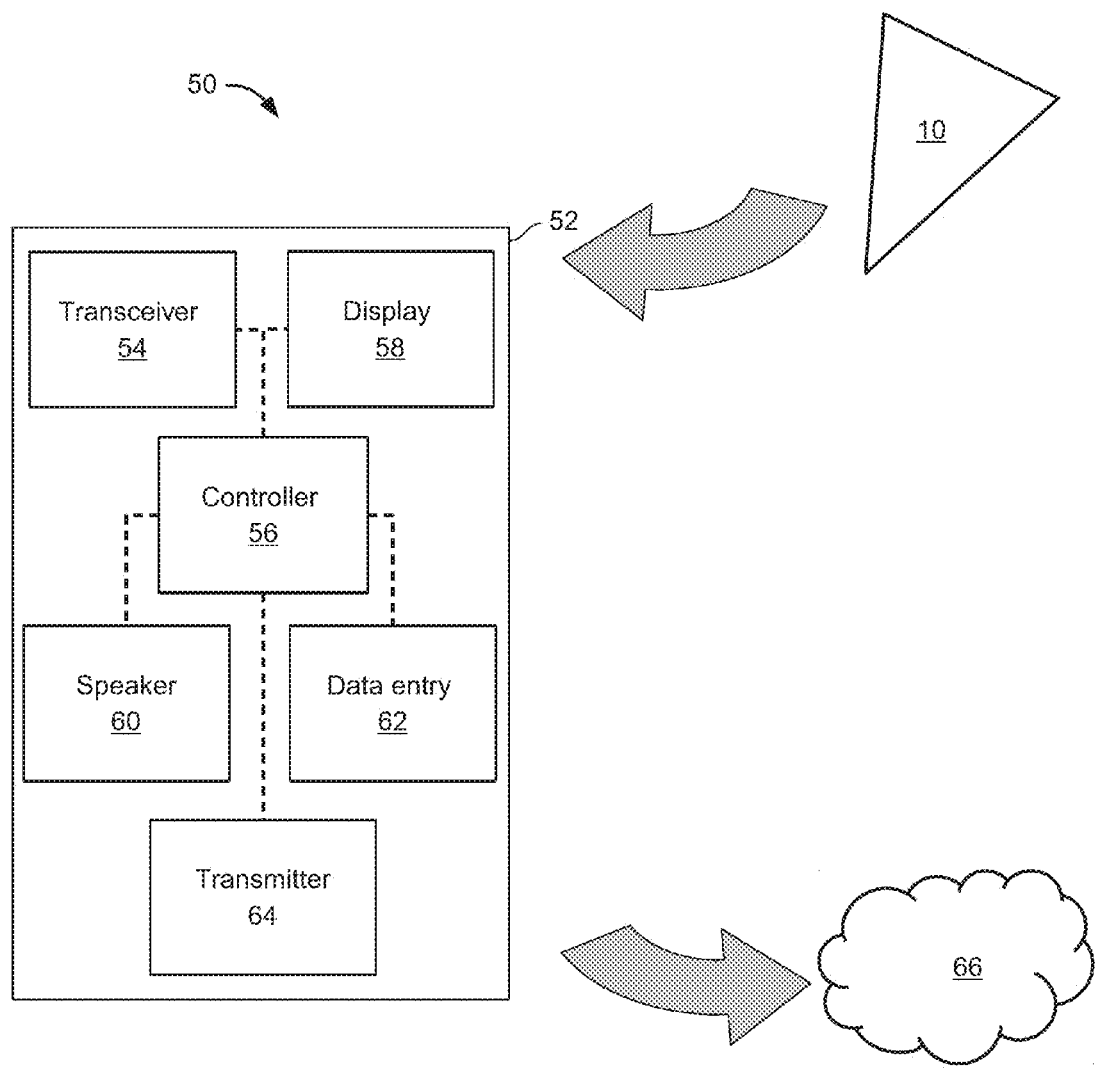
FIG. 3 is a schematic drawing of a system for providing feedback about playing technique including the instrument pick of FIG. 1A.

With continued reference to FIGS. 2A and 2B, the guitar pick 10 can also include a control module 30 including a housing or enclosure 32 extending from or integral with a proximal end of the pick body 12 and enclosing electronic circuitry for collecting, storing, and transmitting data between the pick 10 and a remote device or network (shown in FIG. 3). The remote device can be an electronic device for providing real-time feedback to the user (e.g., a feedback device). In other examples, the remote device can be an external computer network for transmitting data to another location, such as a local network, the Internet, or "the cloud", and/or combinations thereof. The remote device can also be audio or sound equipment for a musical instrument, such as an amplifier, sound board, synthesizer, musical effects generator, or similar electrical device located in proximity to the pick 10. In some examples, the remote device can be a location for storing computer readable data, such as an external hard drive or cloud based data storage location.

As shown in FIG. 2A, the control module 30 is designed to be positioned in a convenient location that will not affect the user's ability to hold the pick 10 while playing the instrument. For example, the control module 30 can extend from a proximal portion of the pick body 12. Further, the control module 30 can extend predominantly on only half of the pick body 12. For example, as shown in FIG. 2A, the majority of the electronic components are positioned to the left of the central longitudinal axis A of the pick 10. In this configuration, a right-handed user can hold the pick 10 between his or her finger and thumb comfortably and without contacting the control module 30. A left-handed user can flip the pick over to avoid contacting the control module 30. In other cases, the pick 10 adapted for left-handed players may be produced with the control module positioned substantially on the right side of the axis A. In some instances, the control module 30 can be generally located on one half of the pick body 12, but can extend slightly past the central axis A. As shown in FIG. 2A, the control module 30 can be thicker than other portions of the pick body 12.

The control module 30 includes a wired or wireless data transmitter 34, such as an antenna for short-range or long-range data transmission. For example, the short-range data transmission circuitry can use the Bluetooth® data transmission protocol. Long range data transmitters can use Wi-Fi (e.g., IEEE 802.11a, b, g, etc.) or cellular networks. Other data transmission protocols, as are known in the art, can also be used within the scope of the present disclosure.

In some examples, signals emitted by the wireless data transmitter 34 can be used as a beacon for locating the pick 10 if lost. For example, a remote device, such as a feedback device 52 (shown in FIG. 3) may receive a wireless signal from the pick 10. The signal can be processed to determine direction and distance to the pick 10. Distance and direction information can be provided to the user via the feedback device. In this way, a user can easily find a lost pick merely by looking at the feedback device. In other examples, the feedback device 52 can emit an instruction which causes the pick 10 to output a sound or visual indication (e.g., a beep, buzz, or light flash) to assist a user in finding the lost pick 10.

The control module 30 also includes one or more computer readable storage devices 36 for receiving and temporarily storing information received from the pressure sensors 20, contact sensors 24, accelerometers 25, and/or gyroscopes 27. The computer readable storage device 36 can include transitory or non-transitory computer memory including, but not limited to, random access memory (RAM), read only memory (ROM), electrically erasable programmable read only memory (EEPROM), flash memory, or other memory technologies, as are known in the art.

The control module 30 can also include a controller 38, such as a micro-controller or microprocessor. The controller 38 can be configured to receive information from the sensors 20, 24, 25, 27 and to prepare the information for storage at the storage device 36 and/or for transmission via the data transmitter 34. For example, the controller 38 may be configured to convert analog signals to digital for transmission (e.g., an analog to digital converter), filter signals to remove noise or other signals artifacts, or compress signals for more efficient storage or data transmission.

The control module 30 can also include a power source, such as a rechargeable battery 40. The rechargeable battery 40 can be a lithium-ion battery, nickel-cadmium battery, or any other suitable rechargeable battery construction as is known in the art. The battery 40 is coupled to the electronic circuitry of the control module 30, as well as to the sensors 20, 24.

The control module 30 can also include a data transfer and recharging port 42, such as a universal serial bus (USB) port, mini-USB port, or micro-USB port, as are known in the art. The port 42 can also be a smaller customized port adapted for size constraints of the pick body 12. The port 42 can be selected based on size constraints of the pick body 12 and control module 30. In some examples, the recharging port 42 can be a proprietary or customized data connection port specifically configured for connecting the pick 10 to a dedicated or multipurpose electronic device. The port 42, which can extend from the proximal end of the control module 30, can be electrically coupled to the battery 40 for recharging the battery when needed. The port 42 can also be electronically coupled to the storage device 36 and used to download information therefrom at times when wireless data transmission is unavailable. In other examples, the battery 40 can be charged be a wireless charging or induction pad, as is known in the art.

As discussed above, the pick body 12 can be similar to a printed circuit board and include sensors 20, 24, 25, 27 embedded therein and connected by one or more printed conductive traces. In another example and with specific reference to FIG. 2B, the pick body 12 can include a conductive element 44, such as a copper or metal alloy layer, enclosed within a hard plastic coating 46. The conductive element 44 can be connected between the sensor 20 and/or contact 24 sensor and the control module 30 and, accordingly, can be used for providing power to the sensors 20, 24, and for conveying information recorded by the sensors 20, 24 to the control module 30 for processing and transmission to the external source.

With continued reference to FIG. 2A, the control module 30 can also include an electronic circuitry for a metronome 48. The metronome 48 can be associated with various audio, visual, or tactile/haptic feedback devices for providing the user with a repeating output to assist the user in keeping a steady tempo. In some instances, the metronome feedback can be provided from the control module 30. For example, the control module 30 can include speakers, lights, or a mechanical stimulator (vibration device) for providing feedback to the user. In other examples, the feedback can be provided from a secondary device such as a smart phone, dedicated electronic device, computer, or tablet PC, separate from, but associated, with the pick 10.

In some examples, the control module 30 can be configured to emit an alarm or warning when a particular event is identified. For example, an alarm may trigger if pressure exerted on the pick 10 and measured by the pressure sensors 20 exceeds a threshold value. The alarm can be an audible alert or haptic feedback element of the control module 30.

Technique Feedback System

Having described a guitar pick 10 including the sensors 20, 24, 25, 27 (shown in FIGS. 2A and 2B) for collecting information about a user's playing technique, with reference to FIG. 3, a system 50 for providing feedback to a user is discussed in detail. The system 50 includes the guitar pick 10 including the data transmitter 34 (shown in FIG. 2A) configured to communicate with a feedback device 52. The feedback device 52 can be a multipurpose electronic device such as a computer, tablet PC, or smart phone. In some examples, the feedback device 52 can be configured to execute downloadable or non-downloadable software (such as an "App") including instructions for obtaining information from the pick 10, processing the information to obtain statistics of interest, and displaying the information to the user. The App can be downloaded from existing online databases or websites as is known in the art. Alternatively, the feedback device 52 can be part of an audio or sound system, such as an amplifier or effects generator.

As discussed above, the connection between the guitar pick 10 and feedback device 52 is preferably a wireless connection via a short range or long range data transmitter. Accordingly, the feedback device 52 includes its own wireless transceiver 54 for sending/receiving communications (e.g., data and instructs) from the guitar pick 10. The feedback device 52 also includes a controller 56, such as a computer processor, for receiving information from the guitar pick 10, and for processing the information to obtain statistics about the user's playing technique (e.g., technique feedback). The feedback device 52 can also include a visual display 58 and/or audio speaker 60 for providing the technique feedback to the user. For example, the visual display 58 can depict a technique dashboard screen showing real time statistics for technique and/or playing style. The display can also provide a practice session report (e.g., a report card) based on information from an entire practice session.

In some examples, information from the pressure sensor 20 can be used to determine a holding pressure that the user is applying to the pick 10. The holding pressure can show whether the user is holding the pick 10 too tightly or too loosely. Further, the holding pressure at a particular time can be compared to a user's normal or preferred holding pressure to show whether the user is improperly tightening up during particular picking or strum patterns. If the measured value is substantially different than the preferred or normal value, the feedback device 52 can be configured to alert the user. Information from the accelerometer and/or contact sensors 24 (shown in FIG. 2A) can be used to determine technique statistics including, for example, a total number of string plucks, pluck rate, pluck accuracy, and/or number or percentage of upstrokes and downstrokes. As discussed above, contact location information from the sensors 24, 25, 27 can be used to determine whether the user is contacting the instrument string with the tip of the pick 10 for the most efficient stroke.

In one example, a user can use the pick 10 to perform a practice activity, referred to as a speed challenge. During the speed challenge, the user plays as many notes as possible within a preselected time period. In some instances, the feedback device 52 can be configured to stop the speed challenge and/or emit an alarm if, at any time during the challenge, holding pressure on the pick 10 exceeds a threshold maximum value. If the user completes the speed challenge without exerting too much pressure on the pick 10, the feedback device 52 can assign a score indicator based on the number of string plucks identified by the feedback device 52 during the challenge. For example, a visual icon, such as a bronze, silver, or gold star, may be displayed on the visual display 58 based on the identified picking speed or number of string plucks.

In other examples, auditory feedback via the audio speaker 60 can be provided. For example, the feedback device 52 can be configured to emit a sound when the pick 10 contacts the guitar string outside of the preferred target zone (e.g., a correction or warning). In other examples, audio feedback can be provided, for example, when the user reaches a predetermined desired number of string plucks in a practice session, indicating that the user has completed the practice session. In still other examples, auditory feedback can be provided at the end of practice sessions. For example, the feedback device 52 can output a positive jingle or ring tone when a positive practice session is completed (e.g., when certain feedback values exceed certain threshold values) or a negative jingle or ring tone when feedback values do not exceed desired thresholds. In other examples, the feedback device 52 can include a data entry portion 62 or accessory for allowing the user to manually enter information. In the case of a smart phone or tablet PC, the data entry portion 62 can be a touch screen, keyboard, or number pad. In other electronic devices, data entry can be provided by a computer keyboard, a mouse, or a trackball. In any case, the data entry portion 62 can allow the user to enter information for a particular practice session, such as a desired practice session duration or a desired number of string plucks. In other examples, the data entry portion 62 can be used to navigate through and review technique data or feedback values determined after a practice session is completed.

With configured reference to FIG. 3, the feedback device 52 can include an additional data transmitter 64 for sending and/or receiving data from a remote source 66, such as a computer network, data server, another computing device, and/or the Internet. In some cases, the remote source may generally be referred to as the cloud. For example, in the case of a smart phone, data can be sent to the remote source 66 via a cellular transmitter or Wi-Fi. Data from the feedback device 52 can also be downloaded to another electronic device by a direct data connection, such as a universal serial bus (USB) connector. For example, the user can upload practice information including feedback values, time spent practicing, and other information, from the feedback device 52 to the remote source 66. The uploaded information can then be displayed on a webpage, stored in an electronic data storage facility (e.g., the cloud), or sent directly to interested third parties.

In some examples, the remote source 66 can be a website including feedback values, practice statistics, and other data for numerous users. In that case, users can compare their respective feedback values against other users as a competition to encourage each other to practice more often or with greater speed and accuracy. In some cases, the website may allow a player to link with his/her friends to set up challenges and/or to control which users are able to view his/her practice statistics. For example, friends may create a practice group in which each member can view the other members' statistics and/or practice reports. Viewing other players' progress and improvement may motivate players to practice more often. In one particular example, the webpage can include feedback values for various professional or expert musicians who have used the pick 10. In that case, individual users can compare their feedback values and statistics to feedback values and statistics obtained by exerts.

In other example, the feedback device 52 can be configured to record information about each string pluck performed by the user for review and/or comparison with preferred picking techniques. For example, the feedback device 52 can be synced with music notation software and configured to update electronic music files (e.g., digital sheet music or tablature) to document whether specific notes were placed with an upstroke or a downstroke. The record including upstroke and downstroke information can be reviewed to assess picking technique and/or to determine whether a different picking pattern (combination of upstrokes and downstrokes) would be better for a particular piece of music. The player's record of upstrokes and downstrokes could also be compared to an ideal picking pattern for a particular song or practice exercise to assess the player's accuracy. Similarly, information obtained by the pick 10 and/or feedback device 52 can be converted into Musical Instrument Digital Interface (MIDI) format. MIDI data generated by the pick 10 and/or feedback device 52 can be transmitted to or collected with data from other MIDI-enabled electronic musical instruments, computers, and other devices. For example, notation, pitch, or volume information from other MIDI-enabled devices can be collected along with picking statistics from the pick 10 to provide information to the user about tone, volume, pitch, and other parameters produced during particular picking patterns.

Figure 4:
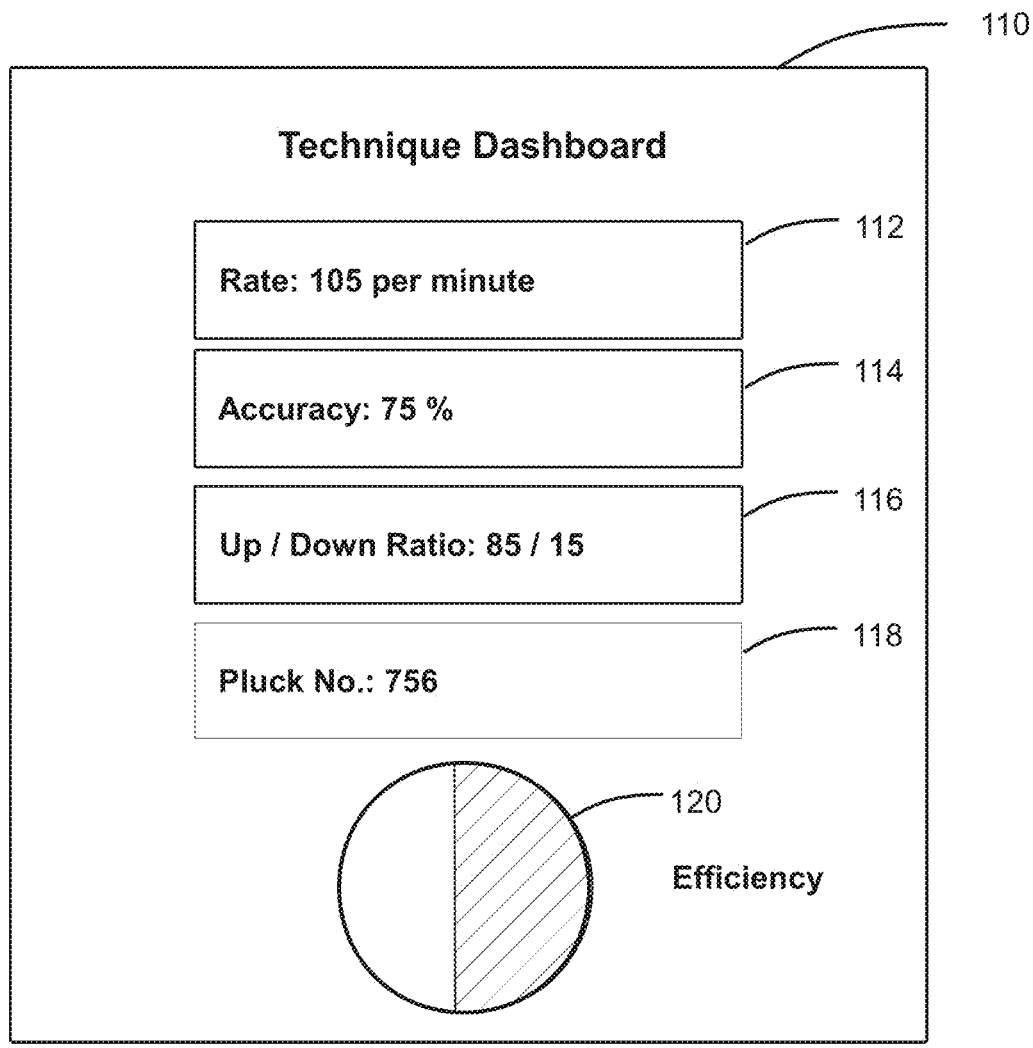
FIG. 4 is an exemplary screen capture of a user interface for providing feedback to a user.

With reference to FIG. 4, a screen capture for an exemplary user interface 110 for the feedback device is illustrated. The user interface 110, which is referred to herein as a technique dashboard, provides real time feedback values for the user showing, for example, pluck rate 112 (e.g., plucks per minute), pluck accuracy 114 (e.g., percent of correct plucks), upstroke, downstroke ratio 116, and total number of string plucks 118. The dashboard can also include an icon or indicator 120 that conveys information about pluck efficiency. For example, the indicator 120 could be a numerical percentage showing what percentage of string plucks were made in the target zone. Alternatively, the indicator 120 could be a graph providing a visual representation of efficiency.

Figure 5:
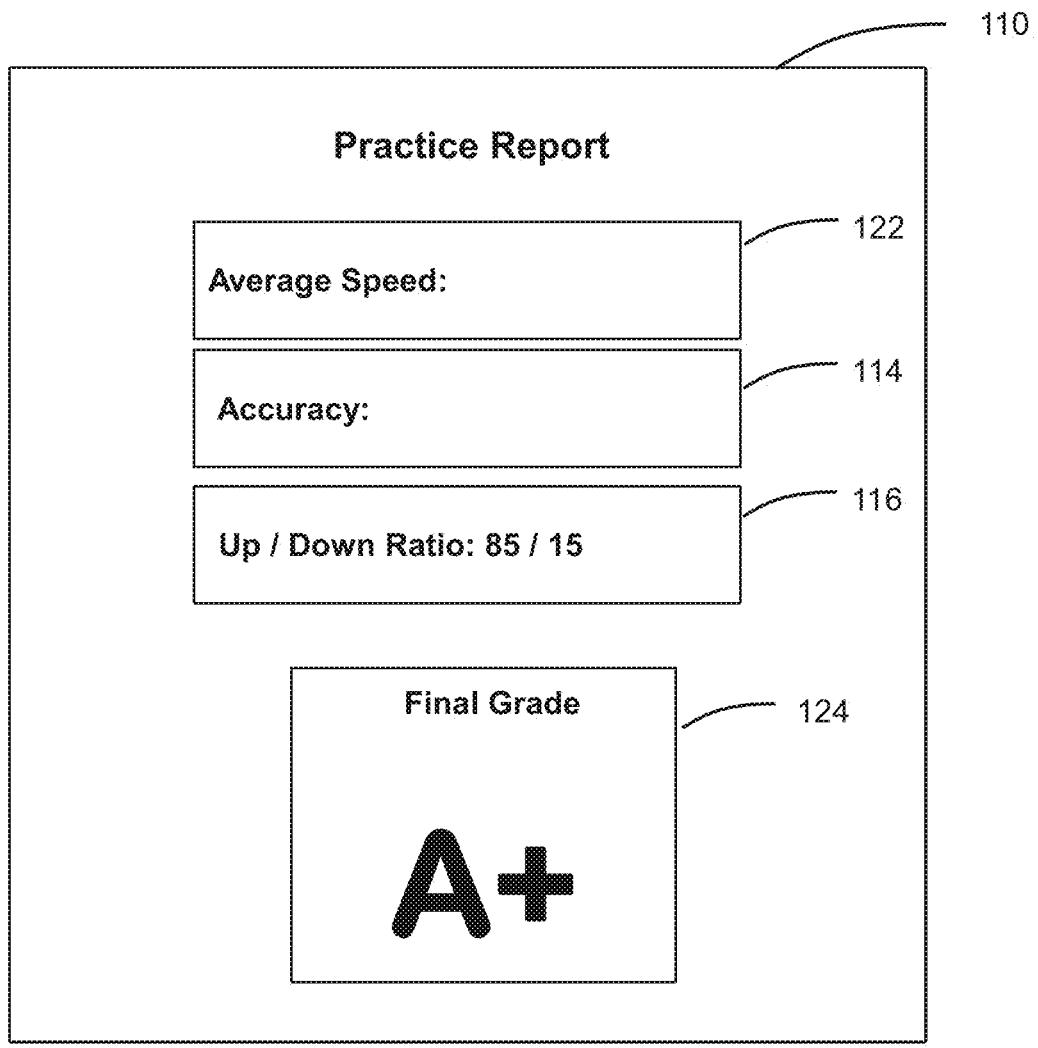
FIG. 5 is an exemplary screen capture of a practice session report shown on a feedback device.

With reference to FIG. 5, another screen capture of an exemplary user interface 110 for the feedback device is illustrated. The user interface 110 depicts a practice session report that can be displayed to the user after a practice session is completed. The practice session report can include many of the statistics discussed above in connection with the dashboard function. In addition, the report can include more cumulative statistics 122 such as average picking speed. In some examples, the report could also include a score or grade 124 based on multiple statistics. For example, a user with a high speed and high accuracy could receive an "A" grade, while a user with high speed but lower accuracy could receive a "B" or "C" grade.

Figure 6:
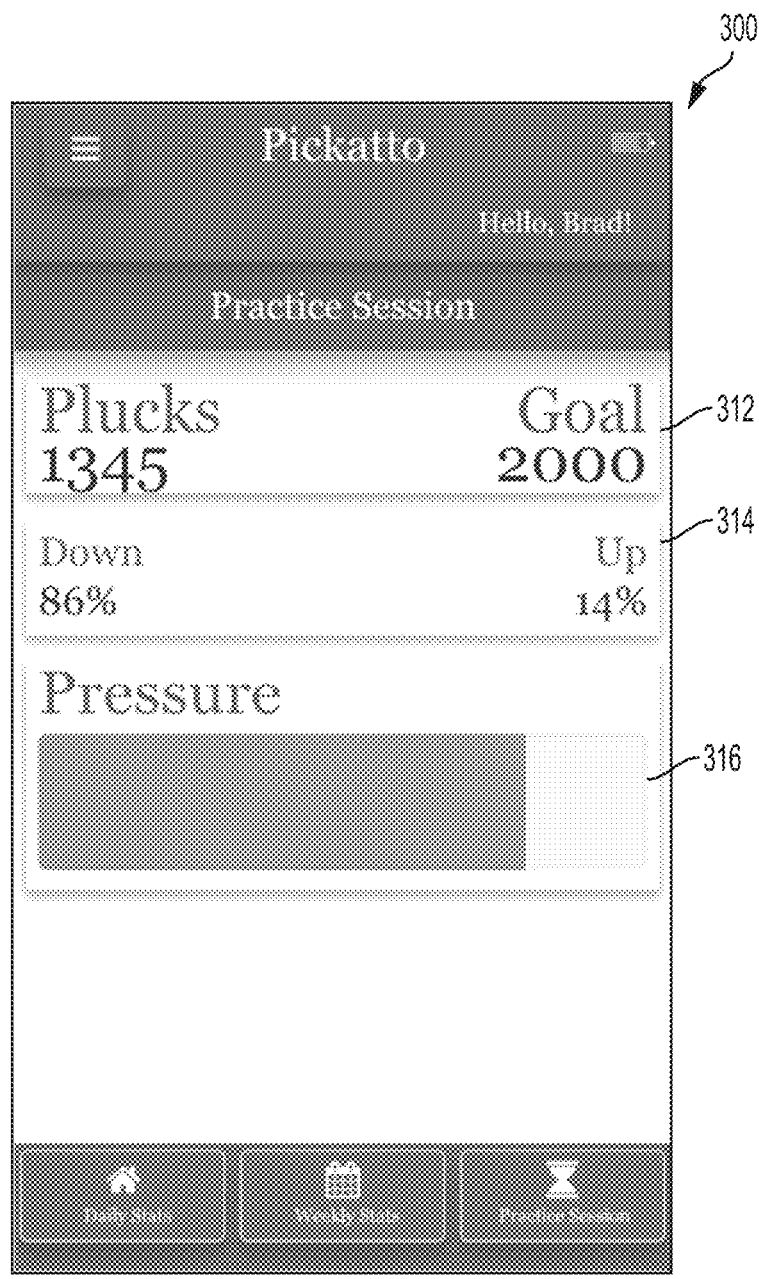
FIG. 6 is an exemplary screen capture of a practice screen capable of providing real-time practice statistics to a user.
Figure 7:
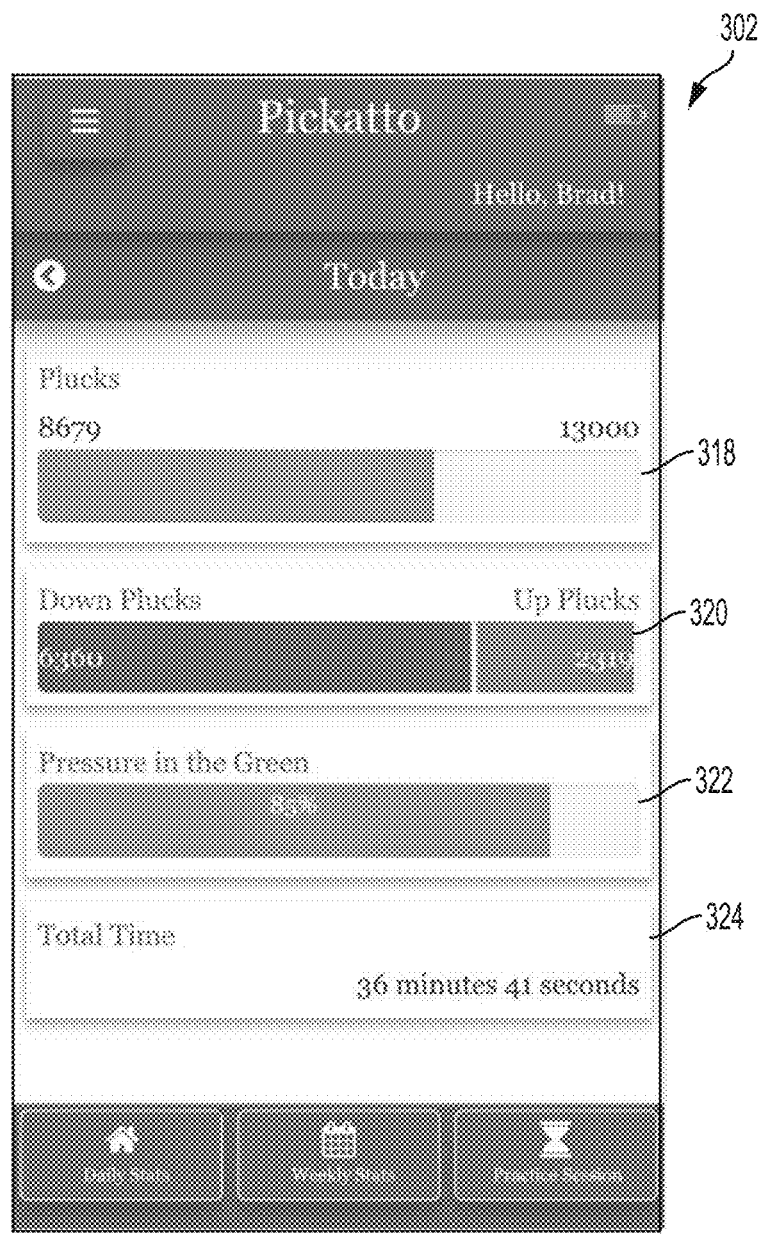
FIG. 7 is an exemplary screen capture of a daily report showing cumulative practice data for a day or practice session.
Figure 8:
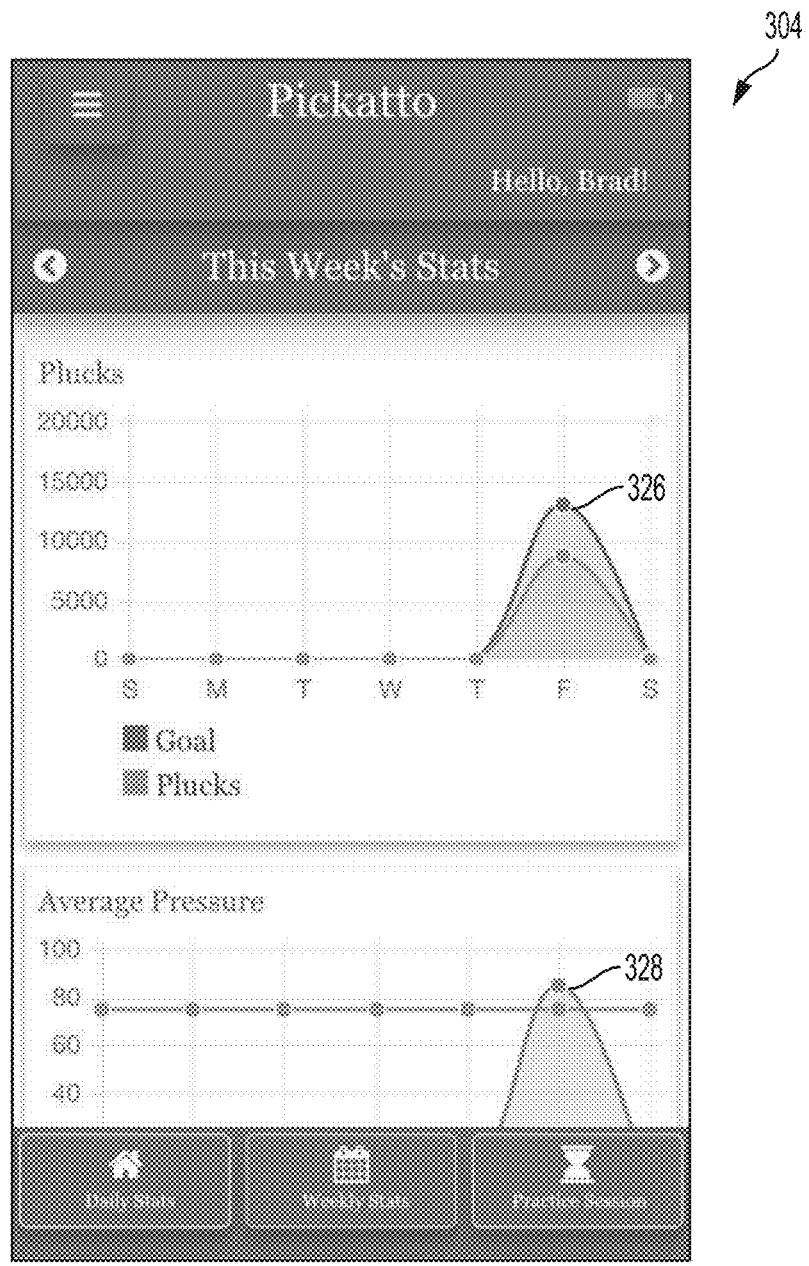
FIG. 8 is an exemplary screen capture of a report covering cumulative data for an entire week.

With reference to FIGS. 6-8 another series of exemplary screen captures for an App that can be associated with the pick and system is illustrated. A screen 300 shown in FIG. 6 provides real-time or substantially real-time data for a current practice session. For example, the screen includes a section 312 with a number of plucks measured by the pick during the practice session. The section 312 may also include a goal value representing the number of plucks the user should perform to complete the practice session. The screen 300 also includes a section 314 showing the upstroke and downstroke ratio. As discussed above, the upstroke/downstroke ratio is a comparison of the number of times the front side of the pick contacts the string compared to the number of times that the back side of the pick contacts the string. The screen 300 also includes a pressure gauge section 316 showing a real-time or substantially real-time pressure exerted on the pick by the user. For example, the pressure gauge section 316 can be a bar or rectangle that increases in length to represent an increase in pressure. The longer the bar, the greater the pressure being exerted on the pick by the user. In some instances, the pressure gauge section 316 may change color or flash if pressure exerted on the string is too high or too low. For example, the section 316 can be green when pressure is correct; the section 316 may turn red when pressure applied to the pick is below or above acceptable threshold values. In some cases, the user may need to determine and manually enter personal maximum and minimum pressure values to calibrate the pressure gauge section 316. In other instances, the minimum and maximum pressure values can be default values determined based on an estimated expected pressure.

FIG. 7 illustrates a screen 302 with statistics for an entire day or an entire practice session. Accordingly, the screen 302 is similar to the practice report shown in FIG. 5. The screen 302 can include a section 318 or gauge illustrating plucks completed compared to a daily goal. The screen 302 can also include a visual representation 320 of upstrokes and downstrokes for the entire practice session. The screen 302 can also include a section 322 showing percentage of time with "Pressure in the Green". As used herein, in the green refers to percentage of time during the practice session or day in which the user was holding the pick with an acceptable amount of pressure. The screen 302 can also include a section 324 with a total or elapsed practice time (e.g., time in which a user exerted pressure on the pick).

FIG. 8 illustrates a screen 304 with weekly statistics accumulated from multiple practice sessions. For example, the screen 304 can include a graph 326 showing plucks per day for the week. The screen 304 can also include a graph 328 illustrating average pressure applied to the pick during each of the week's practice sessions. Viewing pressure applied during each practice session allows users to see whether they are making improvements throughout the week with regard to picking pressure.

Method of Operation

Figure 9:
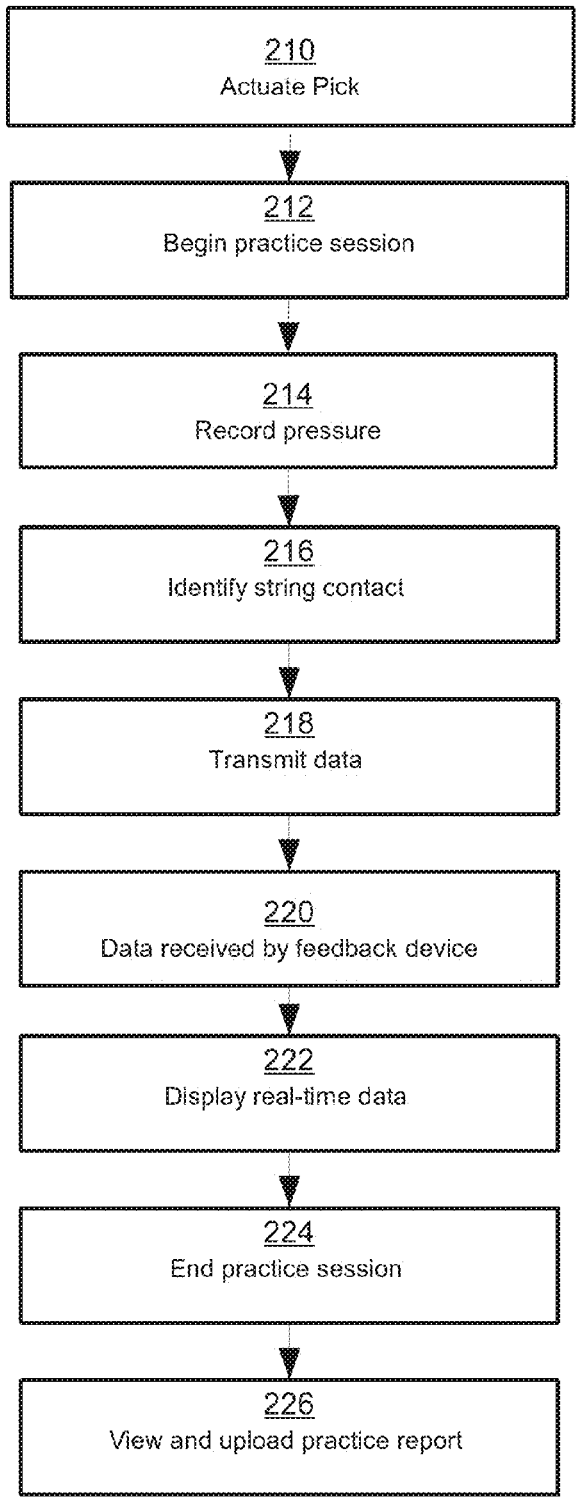
FIG. 9 is a flow chart for providing feedback to a user based on information obtained from an instrument pick.

Having described the guitar pick and technique feedback system, a method of operating the electronic guitar pick and obtaining feedback from the feedback device will be discussed in detail. With reference to FIG. 9, a user begins a practice session by actuating or turning on the electronic guitar pick as shown at box 210. In some examples, the pick may turn on automatically when the user presses against the grip of the pick or when the pick contacts the guitar string. In other examples, the user may press a button on the control module of the guitar pick to actuate the device. In still other examples, a wakeup or turn on signal can be sent to the guitar pick from some external electronic device, such as the feedback device 52 described in connection with FIG. 3. At box 212, the user then begins a practice session by, for example, playing a practice exercise or song. At box 214, the pressure sensors on the guitar pick records pressure information indicative of the amount of pressure that the user applies to the pick. At box 216, the contact sensors identify contact and location information each time that the pick contacts the strings of the instrument. As discussed above, the location information is used to determine whether the user contacts the guitar string with the correct portion of the guitar pick. Contact information is also used to determine plucking rate, plucking accuracy, and other technique feedback values. At box 218, the information obtained from the sensors is transmitted from the guitar pick to a remote source, such as the feedback device. It is noted that information can be streamed in real time from the guitar pick to the remote source, such as the feedback device. In other examples, information, in the form of computer readable data, can be collected and stored on the guitar pick and uploaded from the guitar pick to the remote source in batches according to a predetermined schedule (e.g., every 5 minutes or after a particular amount of data (e.g., 1 gigabyte of data) has been collected).

With continued reference to FIG. 9, at box 220, the information is received by the feedback device. As discussed above, the information can be received in real time or as a batch, such as after a practice session has been completed. The received information is processed by the feedback device to identify feedback values in the manner discussed above. At box 222, the feedback values are provided to the user through a visual display or audio speakers. In the case of real time feedback, the user continues to play the instrument and, as additional information from the pick is received, the feedback values are updated in real time. The feedback device can also display cumulative values showing feedback based on all preceding string plucks in the practice session. At box 224, the feedback device can signal to the user when a practice session is completed. For example, a practice session can be completed after a predetermined period of time or after a predetermined number of string plucks, upstrokes, or downstrokes. At box 226, after the practice session is completed, the feedback device can display a practice session report including cumulative feedback values based on all string plucks that occurred during the practice session. An exemplary practice session report is illustrated in FIG. 5, described above. The user can review the practice session report on the feedback device and, if desired, can upload data, such as an indication that he or she has finished a practice session, individual feedback values for the practice session, the practice session report and/or information (e.g., raw data) collected from sensors on the guitar pick from the feedback device to an external source such as an Internet webpage or cloud based storage device.

While several embodiments of the instrument pick and technique feedback system are shown in the accompanying figures and described hereinabove in detail, other embodiments will be apparent to, and readily made by, those skilled in the art without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive.

The invention claimed is:

1. A pick for an instrument, comprising:
   a pick body having a central portion configured to be held by a user and a tip configured to contact an instrument string;
   at least one sensor arranged on or embedded in the pick body and configured to sense information representative of a pluck of the string with the pick body;
   at least one pressure sensor arranged on or embedded in the pick body and configured to sense pressure between the pick body and the user's fingers or hand; and
   a wireless transmitter configured to obtain information from the at least one sensor configured to sense information representative of a pluck of the string and from the least one pressure sensor, the information from the at least one pressure sensor being representative of an amount of holding pressure between the pick body and the user's fingers or hand, and to transmit the obtained information to a remote device.

2. The pick of claim 1, wherein the central portion of the pick body is between 1 mm and 3 mm thick.

3. The pick of claim 2, wherein the pick body is a substantially triangular or polygonal shape having a maximum width and a maximum length of less than about 40 mm.

4. The pick of claim 1, wherein the information representative of the string pluck comprises information regarding whether a target zone of the pick body contacted the string.

5. The pick of claim 1, wherein the at least one sensor configured to sense information representative of the string pluck comprises a motion sensor configured to sense movement representative of the pluck.

6. The pick of claim 5, wherein the motion sensor comprises one or more of an accelerometer and a gyroscope.

7. The pick of claim 1, wherein the at least one sensor configured to sense information representative of the string pluck comprises at least one contact sensor configured to sense contact between the pick body and the string.

8. The pick of claim 7, wherein the at least one contact sensor comprises an array of sensors arranged to identify a portion of the pick body that contacts the string.

9. The pick of claim 8, wherein the array of sensors is arranged to identify when a target zone of the pick body contacts the string and/or when another portion of the pick body contacts the string.

10. The pick of claim 1, wherein the pick body comprises a grip portion, and wherein the at least one pressure sensor is disposed on the grip portion.

11. The pick of claim 1, wherein the central portion of the pick body has a first thickness, and further comprising an enclosure extending proximally from a proximal end of the pick body, the enclosure having a second thickness which is greater than the first thickness, and wherein the wireless transmitter is at least partially disposed in the enclosure.

12. The pick of claim 1, wherein the pick body comprises a conductive element at least partially enclosed within a plastic cover, and wherein the conductive element electronically connects the wireless transmitter, the at least one pressure sensor, and the at least one sensor configured to identify the string pluck.

13. The pick of claim 1, wherein the information representative of the string pluck comprises an indication of whether a front surface of the pick body contacted the string or a back surface of the pick body contacted the string.

14. The pick of claim 1, wherein the information from the at least one pressure sensor transmitted to the remote device is representative of variations in holding pressure between the pick body and the user's fingers or hand.

15. A system for providing feedback to a user regarding picking technique, the system comprising:
    an instrument pick for plucking a string of an instrument comprising:
      a pick body having a central portion configured to be held by a user and a tip configured to contact an instrument string;
      at least one sensor arranged on or embedded in the pick body and configured to sense information representative of a pluck of the string with the pick body;
      at least one pressure sensor arranged on or embedded in the pick body and configured to sense pressure between the pick body and the user's fingers or hand; and
      a wireless transmitter configured to obtain information from the respective sensors and to wirelessly transmit the obtained information; and
    a feedback device remote from the pick, comprising a controller configured to:
      receive and process information from the at least one pressure sensor of the instrument pick;
      determine a holding pressure exerted on the pick by the user's fingers or hand based, at least in part, on the received and processed information; and
      provide feedback to the user regarding the holding pressure.

16. The system of claim 15, wherein the feedback device further comprises a visual display, and wherein the feedback provided to the user comprises a visual indication on the display comparing the determined holding pressure to target minimum and/or maximum holding pressures.

17. A system for providing feedback to a user regarding picking technique, the system comprising:
    an instrument pick for plucking a string of an instrument comprising:
      a pick body having a central portion configured to be held by a user and a tip configured to contact an instrument string;
      at least one sensor arranged on or embedded in the pick body and configured to sense information representative of a pluck of the string with the pick body; and
      a wireless transmitter configured to obtain information from the at least one sensor and to wirelessl transmit the obtained information; and
    a feedback device remote from the pick, comprising a controller configured to:
      receive and process information from the at least one sensor configured to sense information representative of the string pluck;

determine a number of identified string plucks performed by the user based, at least in part, on the received and processed information;

determine whether the identified string pluck was an upstroke or a downstroke based on the received and processed information; and provide feedback to the user, the feedback comprising the number of string plucks and an indication of a ratio of upstrokes and downstrokes for the identified string plucks.

18. The system of claim 17, wherein the feedback further comprises an indication of plucking efficiency based on a number of identified string plucks that contact a target zone of the pick body and a number of identified string plucks that do not contact the target zone of the pick body.

19. The system of claim 17, wherein the feedback further comprises one or more of plucking rate and total number of string plucks.

20. A computer-implemented method for providing technique feedback to a user based on information received from sensors arranged on or embedded in an instrument pick, the method comprising:

receiving and processing information from at least one pressure sensor arranged on or embedded in the instrument pick;

receiving and processing information from at least one sensor arranged on or embedded in the instrument pick and configured to sense information representative of a string pluck;

determining a holding pressure exerted on the instrument pick by the user and/or a number of identified string plucks performed by the user based, at least in part, on the received and processed information;

determining whether the identified string plucks were upstrokes or downstrokes based on the received and processed information;

comparing the identified upstrokes and downstrokes with a preferred picking technique for a song or practice exercise; and providing feedback to the user, the feedback comprising an indication of accuracy for the song or practice exercise based, at least in part, on the comparison of the upstrokes and downstrokes.

* * * * *

UNITED STATES PATENT AND TRADEMARK OFFICE
CERTIFICATE OF CORRECTION

PATENT NO. : 9,640,151 B2  
APPLICATION NO. : 15/179037  
DATED : May 2, 2017  
INVENTOR(S) : Michael G. Murawski It is certified that error appears in the above-identified patent and that said Letters Patent is hereby corrected as shown below:

In the Claims

Column 15, Line 30, Claim 1, delete "the least" and insert -- the at least --

Column 16, Line 61, Claim 17, delete "wirelessl" and insert -- wirelessly --

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*